(12) United States Patent
Archdeacon et al.

(10) Patent No.: US 9,583,018 B1
(45) Date of Patent: Feb. 28, 2017

(54) RECONFIGURABLE IMAGE GENERATOR

(71) Applicant: The United States of America as represented by the Administrator of the National Aeronautics & Space Administration (NASA), Washington, DC (US)

(72) Inventors: John L. Archdeacon, San Ramon, CA (US); Nelson H. Iwai, Mountain View, CA (US); Kenji H. Kato, San Jose, CA (US); Barbara T. Sweet, Sunnyvale, CA (US)

(73) Assignee: The United States of America as Represented by the Administrator of the National Aeronautics and Space Administration, Washington, DC (US)

(*) Notice: Subject to any disclaimer, the term of this patent is extended or adjusted under 35 U.S.C. 154(b) by 314 days.

(21) Appl. No.: 14/302,750

(22) Filed: Jun. 12, 2014

Related U.S. Application Data (60) Provisional application No. 61/834,294, filed on Jun. 12, 2013.

(51) Int. Cl.
*G09B 9/08* (2006.01)
*G06F 17/30* (2006.01)

(52) U.S. Cl.
CPC ......... *G09B 9/08* (2013.01); *G06F 17/30247* (2013.01); *G06F 17/30321* (2013.01)

(58) Field of Classification Search
None
See application file for complete search history.

(56) References Cited

U.S. PATENT DOCUMENTS

| | | | | |
|---|---|---|---|---|
| 6,711,163 B1* | 3/2004 | Reid | ............. | H04L 12/1836 370/390 |
| 7,293,235 B1* | 11/2007 | Powers | ............. | G06T 7/20 463/1 |
| 2004/0153526 A1* | 8/2004 | Haun | ............. | G06F 9/00 709/217 |
| 2005/0266856 A1* | 12/2005 | Yamada | ............. | H04L 12/5895 455/456.1 |
| 2006/0244758 A1* | 11/2006 | Ruge | ............. | G06F 3/14 345/592 |
| 2007/0240140 A1* | 10/2007 | Degenaro | ............. | G06F 9/5066 717/158 |
| 2009/0201299 A1* | 8/2009 | Bhogal | ............. | A63F 13/12 345/474 |
| 2011/0126255 A1* | 5/2011 | Perlman | ............. | A63F 13/12 725/116 |

(Continued)

OTHER PUBLICATIONS

John Archdeacon et al., "An Operationally Based Vision Assessment Simulator for Domes," presented at IMAGE 2012 Conference in Jun. 2012.

(Continued)

*Primary Examiner* — Maurice L McDowell, Jr.
(74) *Attorney, Agent, or Firm* — Christopher J. Menke; Robert M. Padilla; John F. Schipper (57) ABSTRACT

A RiG may simulate visual conditions of a real world environment, and generate the necessary amount of pixels in a visual simulation at rates up to 120 frames per second. RiG may also include a database generation system capable of producing visual databases suitable to drive the visual fidelity required by the RiG.

20 Claims, 9 Drawing Sheets

(56) References Cited

U.S. PATENT DOCUMENTS

| | | | | |
|---|---|---|---|---|
| 2012/0011545 A1* | 1/2012 | Doets | ................ | H04N 7/17336 |
| | | | | 725/38 |
| 2013/0316829 A1* | 11/2013 | Derome | ................... | A63F 9/24 |
| | | | | 463/37 |
| 2014/0028907 A1* | 1/2014 | Nuyttens | ................. | H04N 9/12 |
| | | | | 348/383 |

OTHER PUBLICATIONS

John Archdeacon et al., "Achieving Eye-Limiting Resolution: The Devil in the Details," published by Royal Aerospace Society in Nov. 2012.

Barbara T. Sweet et al., "The Impact of Motion-Induced Blur on Out-The-Window Visual System Performance" presented at Image 2007 Conference in Jul. 2007.

Barbara T. Sweet et al., "Effects of Spatio-Temporal Aliasing on Out-The-Window Visual" presented at IMAGE 2008 Conference in Jun. 2008.

Barbara T. Sweet et al., Choosing Your Poison: Optimizing Simulator Visual System Selection As a Function of Operational Tasks, presented at IMAGE 2013 Conference in Jun. 2013.

\* cited by examiner

RECONFIGURABLE IMAGE GENERATOR

CROSS REFERENCE TO RELATED APPLICATION

This application is a non-provisional of, and claims priority to, U.S. Provisional Patent Application Ser. No. 61/834,294, filed Jun. 12, 2013. The subject matter of this earlier-filed application is hereby incorporated by reference in its entirety.

ORIGIN OF THE INVENTION

The invention described herein was made in the performance of work under a NASA contract and by an employee of the United States Government and is subject to the provisions of Section 20135(b) of the National Aeronautics and Space Act, Public Law 111-314, §3 (124 Stat. 3330, 51 U.S.C. Chapter 201), and may be manufactured and used by or for the Government for governmental purposes without the payment of any royalties thereon or therefore.

FIELD OF THE INVENTION

The present invention generally pertains to an image generator, and, more particularly, to a reconfigurable image generator (RiG) configured to provide a real-time simulation environment to a user.

BACKGROUND OF THE INVENTION

Air Force pilots entering the service generally have superior visual acuity, on the average 20/13. However, current research based simulators (or image generators) provide visual acuity on the average of 20/40 or 20/80. Furthermore, current research based simulators are often very expensive to build and fail to provide eye limiting resolution, i.e., acuity better than 20/13.

In order to study human vision in an operationally relevant environment, an image generator that matches conditions of the real world may be beneficial. For example, a research based image generator configured to provide eye limiting resolution, e.g., better than 20/13, may be particularly beneficial. A database that provides eye limiting resolution imagery based on a desired simulation context and hardware configured to produce the necessary amount of pixels at a minimum of 60 frames per second may also be beneficial. Existing legacy databases typically cannot provide sufficient resolution with high-fidelity.

SUMMARY OF THE INVENTION

Certain embodiments of the present invention may be implemented and provide solutions to the problems and needs in the art that have not yet been fully solved by conventional vision assessment systems. For example, some embodiments pertain to a reconfigurable image generator (RiG) that matches conditions of the real world and produce the necessary amount of pixels at a minimum of 60 frames per second.

In one embodiment of the present invention, an apparatus includes at least one processor and memory including a set of instructions. The set of instructions with the at least one processor are configured to cause the apparatus to calculate a spatially bound index of an area defined by a spatial center with extents in at least two spatial dimensions, and utilize the calculated spatially bound index to extract image and/or spatial data from an online database, and format the extracted image and/or spatial data into a runtime data format. The set of instructions with the at least one processor are further configured to cause the apparatus to combine the formatted runtime image and/or spatial data with existing image and/or spatial data from an existing database to produce a correlated data set of indexed imagery and/or spatial data that is optimized, thus allowing the correlated data set of indexed imagery and/or spatial data to be read into at least one reconfigurable image generator.

In another embodiment of the present invention, a system includes a host computer, a plurality of rendering devices, and a managing device. A bidirectional communication exists between the host computer and each of the plurality of rendering devices and the managing device.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention pertain to a RiG configured to simulate visual conditions of a real world environment and generate the necessary amount of pixels in a visual simulation at rates up to 120 frames per second. Such a system may provide eye limiting resolution that is closely aligned to real world visual conditions experience during activities such as flight. Embodiments of the present invention also include a database generation system capable of producing visual databases suitable to drive the visual fidelity required by the RiG.

Figure 1:
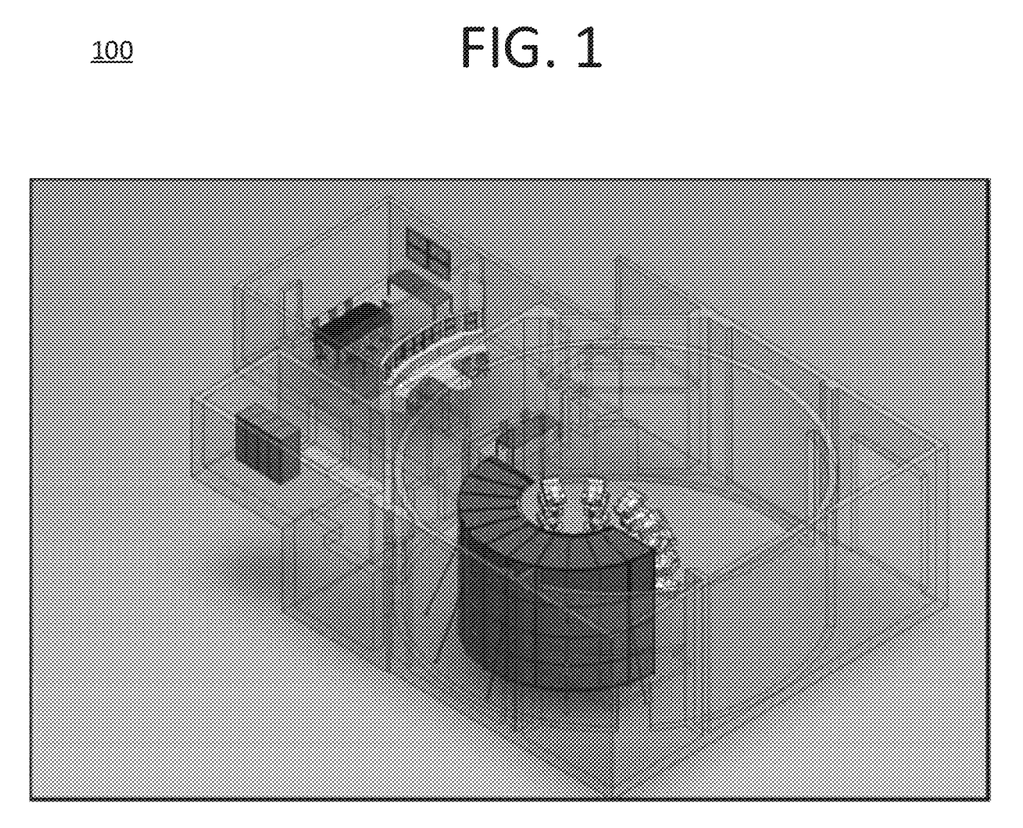
FIG. 1 illustrates an operationally based vision assessment (OBVA) simulator, according to an embodiment of the present invention.

FIG. 1 illustrates an OBVA simulator 100, according to an embodiment of the present invention. OBVA simulator 100 provides the Air Force School of Aerospace Medicine, for example, with a scientific testing laboratory to study human vision and testing standards in an operationally relevant environment. OBVA simulator 100 may provide a real-time RiG and display subsystem that can display and update frames at 120 frames per second, or at a minimum, 60 frames per second, with minimal transport delay. Any number of frames may be used as a matter of design choice, but frame rates in excess of 60 Hz reduce image motion depiction artifacts, and enable stereoscopic image presentation with a single image generator.

Figure 2:
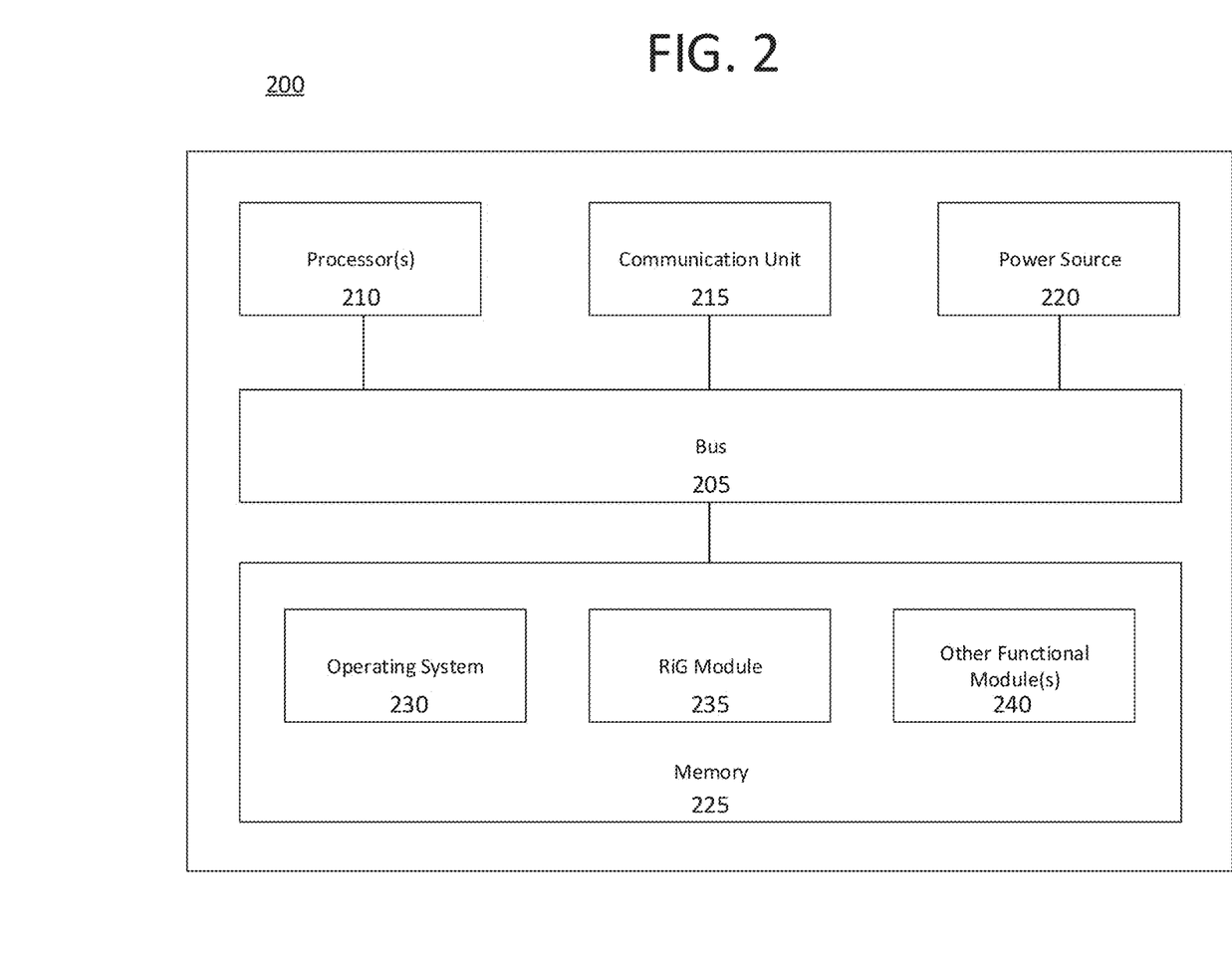
FIG. 2 is a block diagram illustrating a computing system for the OBVA simulator of FIG. 1, according to an embodiment of the present invention.

FIG. 2 is a block diagram illustrating a computing system 200 for the OBVA simulator 100 of FIG. 1, according to an embodiment of the present invention. Computing system 200 may include a bus 205 or other communication mechanism configured to communicate information, and at least one processor 210, coupled to bus 205, configured to process the information. At least one processor 210 can be any type of general or specific purpose processor. Computing system 200 may also include memory 225 configured to store information and instructions to be executed by at least one processor 210. Memory 225 can be comprised of any combination of random access memory ("RAM"), read only memory ("ROM"), static storage such as a magnetic or optical disk, or any other type of computer readable medium. Computing system 200 may also include a communication device 215, such as a network interface card, configured to provide access to a network, and a power source 220 configured to power computing system 200 or any peripheral device connected to computing system 200.

The computer readable medium may be any available media that can be accessed by at least one processor 210. The computer readable medium may include both volatile and nonvolatile medium, removable and non-removable media, and communication media. The communication media may include computer readable instructions, data structures, program modules, or other data and may include any information delivery media.

At least one processor 210 can also be coupled via bus 205 to one or more displays (not shown). The one or more displays may display simulation (or scene) imagery from a database. A keyboard and a cursor control unit (also not shown), such as a computer mouse or joystick, may also be coupled to bus 205 to enable the user to interface with computing system 200.

According to one embodiment, memory 225 may store software modules that may provide functionality when executed by at least one processor 210. The modules can include an operating system 230 and a RiG module 235, as well as other functional modules 240. Operating system 230 may provide operating system functionality for computing system 200. Because computing system 200 may be part of a larger system, computing system 200 may include one or more additional functional modules 240 to include the additional functionality. Additional functional modules 240 may include a RiG manager module, one or more RiG renderer modules, etc. It should be appreciated that the one or more additional functional modules 240 may be stored on more than one computing system such that each computing system may execute a stored functional module 240.

One skilled in the art will appreciate that a "system" could be embodied as a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems, and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 3:
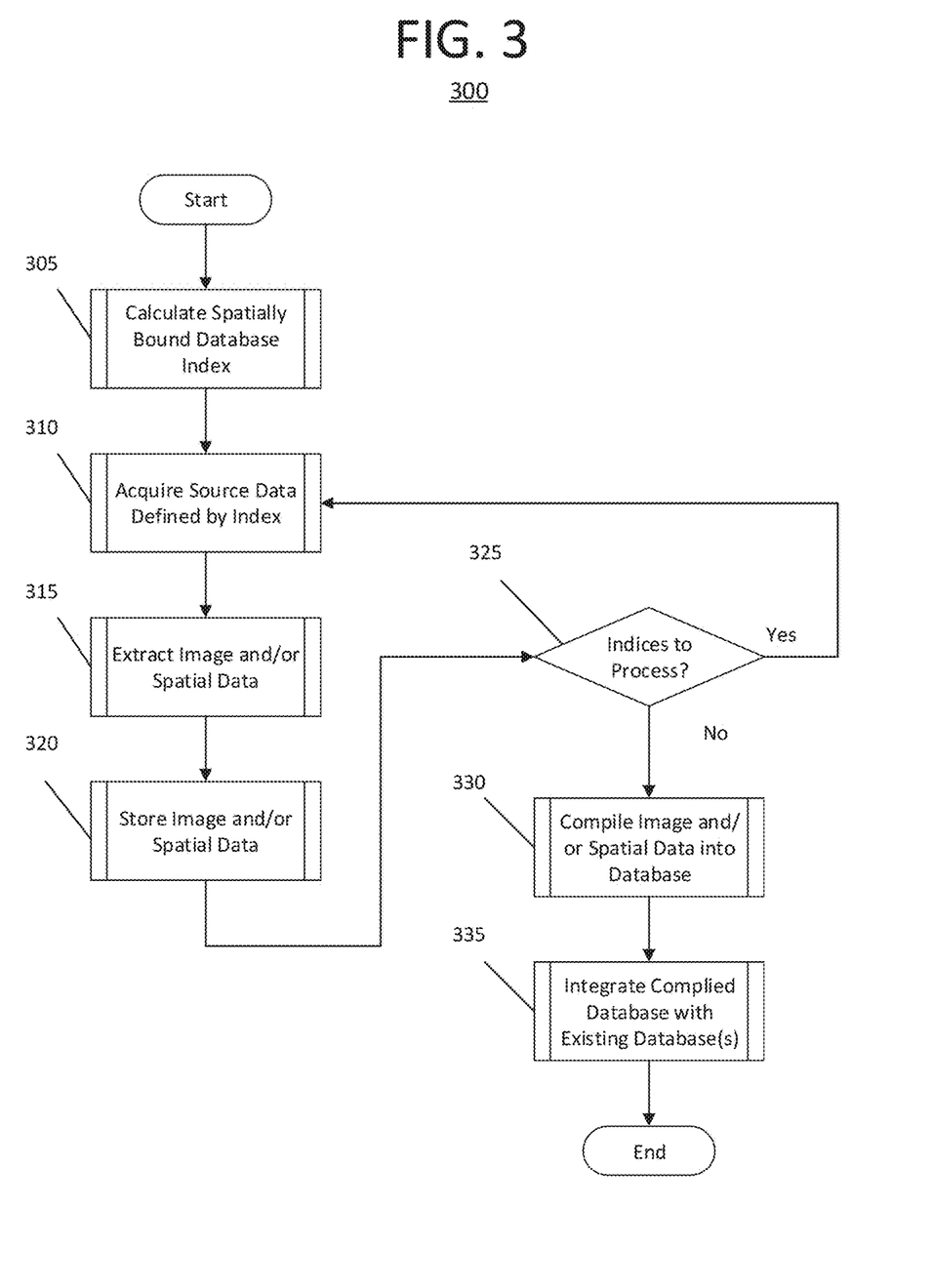
FIG. 3 is a flow diagram illustrating a process for generating databases for the OBVA simulator, according to an embodiment of the present invention.

FIG. 3 is a flow diagram 300 illustrating a process for generating and building databases for the OBVA simulator, according to an embodiment of the present invention. In some embodiments, the process of FIG. 3 may be executed by, for example, computing system 200 of FIG. 2. To generate a visual database with eye limiting resolution, sufficient amounts of data may be indexed with a module of executable code. The module of executable code may include a single instruction, or many instructions, and may even be distributed over several different code segments, among different programs, and across several memory devices.

In this embodiment, the process begins at 305 with the calculation of a spatially bound database index using RiG terrain tools. Spatially bound may refer to a set of geographic coordinates found in geospatial software such as Google Earth®, or a quantifiable location in reference to an image or data set. A more detailed description of the process for calculating a spatially bound database index is discussed below with respect to FIG. 4.

Figure 4:
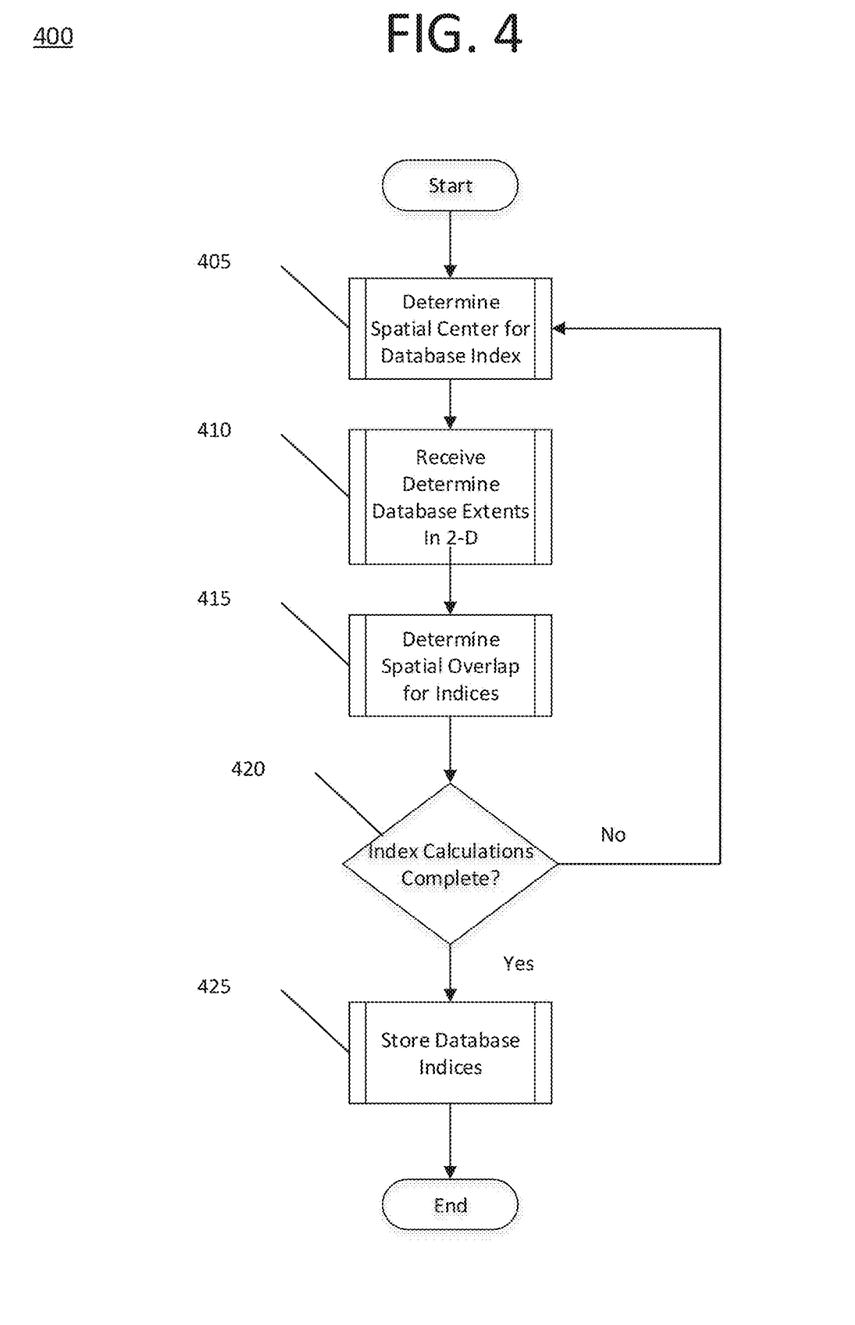
FIG. 4 is a flow diagram illustrating a process for calculating a spatially bound database index to produce data for the RiG, according to an embodiment of the present invention.

FIG. 4 is a flow diagram 400 illustrating a process for calculating a spatially bound database index to produce data for a RiG, according to an embodiment of the present invention. In some embodiments, the process of FIG. 4 may be executed by computing system 200 of FIG. 2, for example.

In this embodiment, the process begins at 405 with the computing system determining the spatial center for a database index. The spatial center for the database index may be represented by coordinates, in two dimensions, of a locational datum in a source data set including, but not limited to, an image or geospatial data. In a further embodiment, the spatial center for the database index may also include two measurements, defining a dimensional area in the source data set, with a center found at the locational datum, representing a subset of the complete source data set.

At 410, the events of the database index is determined in two dimensions. The two dimensions represent the full spatial area to be covered by subsets extracted from the source data set. At 415, spatial overlap, in two dimensions, for indices of the spatially bound database index are determined to provide optimal source data inclusion for the calculated spatially bound database index. At 420, the computing system determines whether the information currently provided for calculating the complete spatially bound database index matches the previously provided data, i.e., determines whether index calculations are complete. If not, the process returns to 405 and continues to incorporate new data into the index calculations. If the current data provided to the computing system matches the previously provided data, the database index calculation is completed, and the process continues to 425. At 425, the complete database index computed by the computing system is stored as individual indices. These stored indices may be changed or updated in the future by starting the process illustrated in FIG. 4 again by returning to 405.

Returning to FIG. 3, once the spatially bound database index is calculated, the process continues to 310 with the computing system using the stored indices to acquire source data, and format the source data for extraction using systems designed for accessing and decoding image and/or spatial data. In this embodiment, the source data is accessed and acquired using Google Earth®, for example. Source data may also include, but is not limited to, data files containing pixel information and/or spatial data sets. File formats may include, but are not limited to, .jpgs, .tiff, .dem, .dted, and .shp. At 315, the computing system extracts the imagery and/or spatial data from the source data defined by indices found in the spatially bound database index using Presagis Creator™, for example.

The computing system at 320 stores the imagery and/or spatial data into a database. At 325, the computing system determines whether additional indices still need to be processed. If additional indices are available or require processing, the computing system may acquire and extract additional source data defined by the spatially bound database index by returning to 310 and repeating the previously described flowchart operations. Otherwise, at 330, the computing system utilizes a database compiler to optimize the stored imagery and/or spatial data, and save the imagery and/or spatial data into an optimized format, allowing the imagery and/or spatial data to load and operate at a fast rate during execution of the RiG.

At 335, the computing system combines image and/or spatial data from existing databases (also known as legacy databases) of the image generator with image and/or spatial data from the compiled image and/or spatial database previously created at 330. Image and/or spatial data from the existing databases may include, for example, buildings, bridges, streets, cars, aircraft, etc. Stated differently, elements not found in the acquired image and/or spatial data may be found in the image and/or spatial data from the existing databases. This allows the computing system to ingest the database and create a real-world environment during the simulation process.

Historically, the process to build such an image and/or spatial database would take many man months, or even years. However, the process shown in FIGS. 3 and 4 allows the image and/or spatial database to be created within a few days or faster, depending on the computing resources that are available. Furthermore, this process allows updates to the image, and in some cases the spatial, database to occur seamlessly.

It should be noted that this process differs from the traditional generation of image and/or spatial databases for visual simulation. For example, traditional systems utilize a defined, edge bound, spatial data structure. In these systems, the coordinate of at least two corner locations, in a rectangular shape, are known, and one of these coordinates is used as a reference index point for the database, and/or a sub section of the database. In contrast, some embodiments of the present invention utilize a known central spatial index location as a reference for the database as generated by the process described in FIG. 3. In these embodiments, the central spatial location for the database, or elements of the database during the building process, are stored as indices as computed by the process described in FIG. 4. This means that specific edge locations are not stored in the index, and are derived by application of the spatial extent, in at least two dimensions, covered by the database. Stated differently, the center of the database is a known coordinate, and the area covered by the database is known, but the exact edge bounds must be inferred from this data. This has the distinct advantage of allowing a visual database to be centered about, and built with, one or more, specific areas of interest, as exact known spatial locations.

Figure 5:
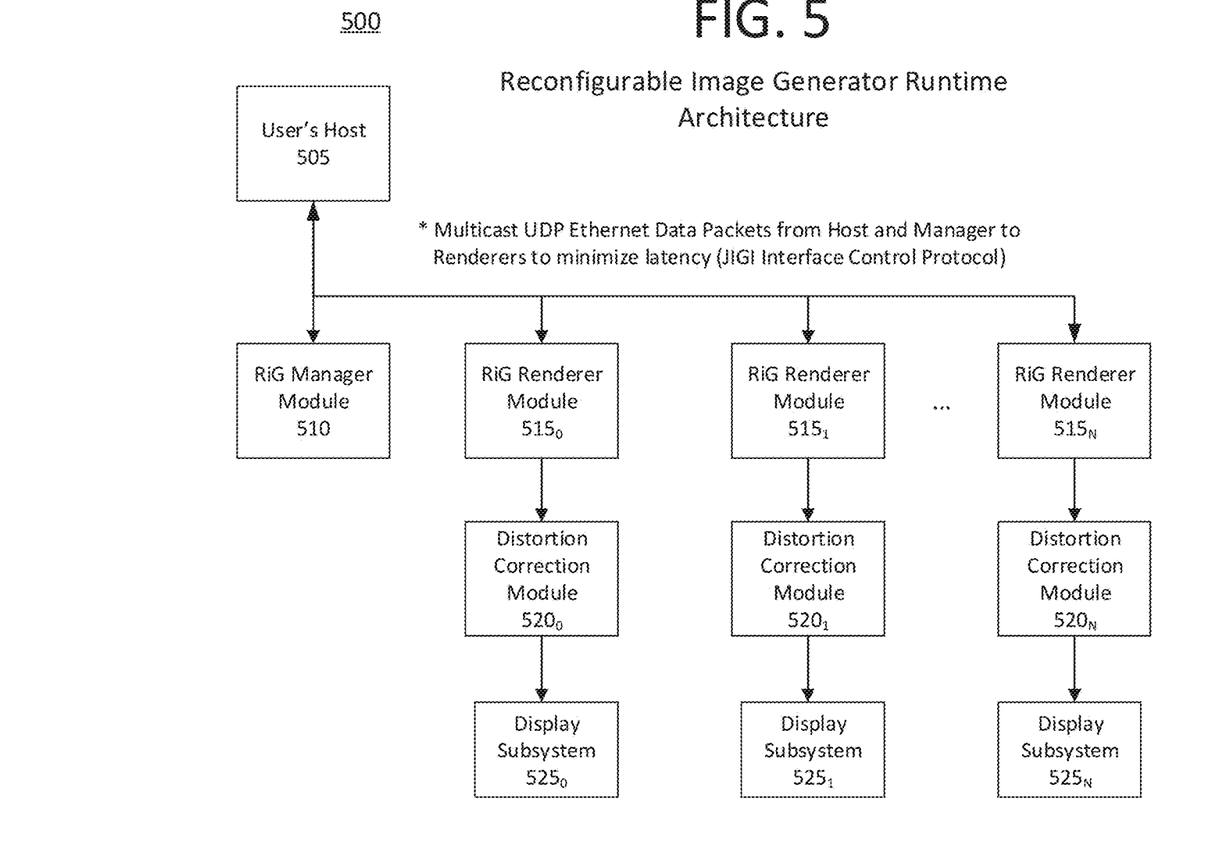
FIG. 5 illustrates runtime architecture for the RiG, according to an embodiment of the present invention.

FIG. 5 illustrates runtime architecture 500 for a reconfigurable image generator (RiG) module, according to an embodiment of the present invention. As discussed earlier, RiG manager module 510 may be executed by computing system 200 of FIG. 2, for example, and RiG renderer modules 515 may be executed by separate computing systems. In other words, RiG manager module 510 and RiG renderer modules 515 may be located on separate computing systems.

Typically, an image generator's primary responsibility is to draw pictures (or frames) that simulate the scene of the outside world while being as realistic as possible and as fast as possible. Most image generators operate at 30 to 60 frames per second. The RiG runtime architecture in this embodiment may operate at 120 frames per second, which is faster than conventional image generators. The graphics subsystems of the renderer modules may optionally be frame locked and swap locked.

To operate at such speeds, bidirectional communication may exist between RiG manager module 510 and a host computer 505. Host computer (or simulation computer(s)) 505 may be a simulator operated by a user, for example. Bidirectional communication may also exist between host computer 505 and each of RiG renderer modules 515, as well as bidirectional communication between RiG manager module 510 and RiG renderer modules 515. Bidirectional communication may also occur between host computer 505 and RiG manager module 510.

To achieve rates of 120 frames per second, an image generator interface (JIGI) is utilized in this embodiment. JIGI may be a data packet interface that allows host computer 505 to multicast data packets to RiG manager module 510 and to one or more RiG renderer modules 515. This allows RiG renderer modules 515 to simultaneously receive the data packets with minimum latency. A similar application applies when RiG manager module 510 multicasts data packets to host computer 505 and to one or more RiG renderer modules 515.

It should be noted that the RiG allows for a more flexible design that is desirable since many of the data packets envisioned for the research scientist would generally be "highly custom" in nature. Since the RiG is reconfigurable, a common image generator interface (CIGI) protocol may be added for training systems that prefer to use CIGI.

RiG manager module 510 controls one or more RiG renderer modules 515. RiG manager module 510 makes it possible to control an arbitrary array of RiG renderer modules 515 as if they are one monolithic machine. The RiG manager may include boot-up or wake-up control from a single location, shutdown and data synchronization services between RiG manager module 510 and RiG renderer modules 515. RiG manager module 510 can send messages to boot or shutdown renderer module computing systems, if they are separate computing systems. Once RiG renderer modules 515 are up and running, RiG manager module 510 can startup and kill processes on each of RiG renderer modules 515, including control over the simulated environment (time of day, weather, and so on).

It should be appreciated that in some embodiments, RiG renderer module 515 is associated with each display (or projector) 525. However, in other embodiments, a single RiG renderer module 515 may be associated with one or more displays 525. Because displays may be curved in some embodiments to more accurately simulate real flight conditions, a distortion module 520 may be used for pixel correction. As a result, latency may be minimized due to distortion module 520. In embodiments where displays 525 are flat panels, a distortion module 520 may not be necessary.

Figure 6:
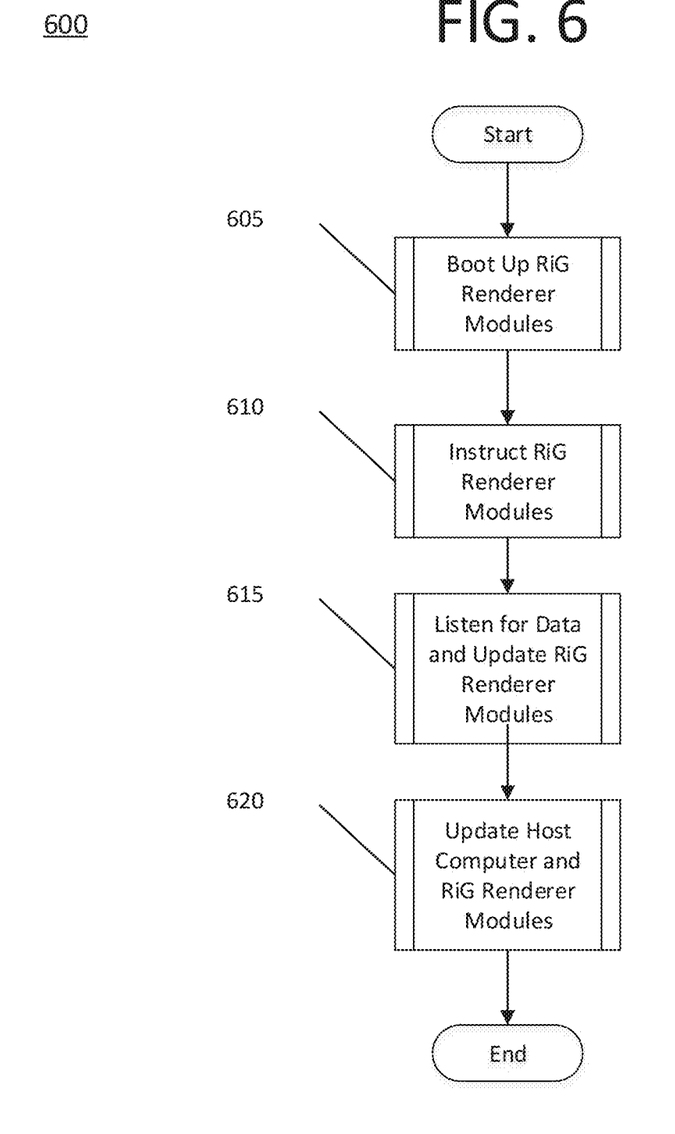
FIG. 6 is a flow diagram illustrating an initialization process executed by a RiG manager module, according to an embodiment of the present invention.

FIG. 6 is a flow diagram 600 illustrating an initialization process executed by the RiG manager module, according to an embodiment of the present invention. In some embodiments, the process of FIG. 6 may be executed by computing system 200 of FIG. 2, for example.

In this embodiment, the process begins at 605 with the RiG manager module booting up any offline RiG renderer computers (and module), synchronizing data across the various file systems of each RiG computer when required, loading synthetic environment setup information as requested by the user, and performing network configuration and communications settings between the RiG manager, renderer modules and host computer, as required for runtime. Text files may describe the computer network and synthetic environment settings for a particular simulation and may be edited and saved with the RiG Manager. These text files may also include the initial synthetic environment including, but not limited to, the terrain model to be rendered, the moving models to be used (both 2D and 3D), and all other initial conditions, such as time-of-day, weather settings, time-of-year, frustum control, and other initial condition variables.

At 610, the RiG manager module instructs the RiG renderer modules to load all required database files (terrain, moving models) prior to entering runtime. At 615, the RiG manager module is in runtime mode and listens for data from the host computer or the IG Manager. When data is received, the RiG manager module instructs the RiG renderer module to update its synthetic environment and view frustum as commanded in a synchronized fashion. These data updates may include changes in time of day, changes in pitch angle of aircraft, etc.

At 620, the RiG manager module may update the host computer with information loaded from the visual database. For example, as the host computer is flying a simulated aircraft through a synthetic scene, changes to the scene on the RiG renderer modules may be updated by user interface changes on the RiG manager module or from the user's host computer. The process between step 615 and 620 are repeated and may continue until the simulation has been completed at which time the RiG manager module may optionally command the RiG renderer modules to terminate their rendering programs and/or shutdown entirely until they are awakened later.

Figure 7:
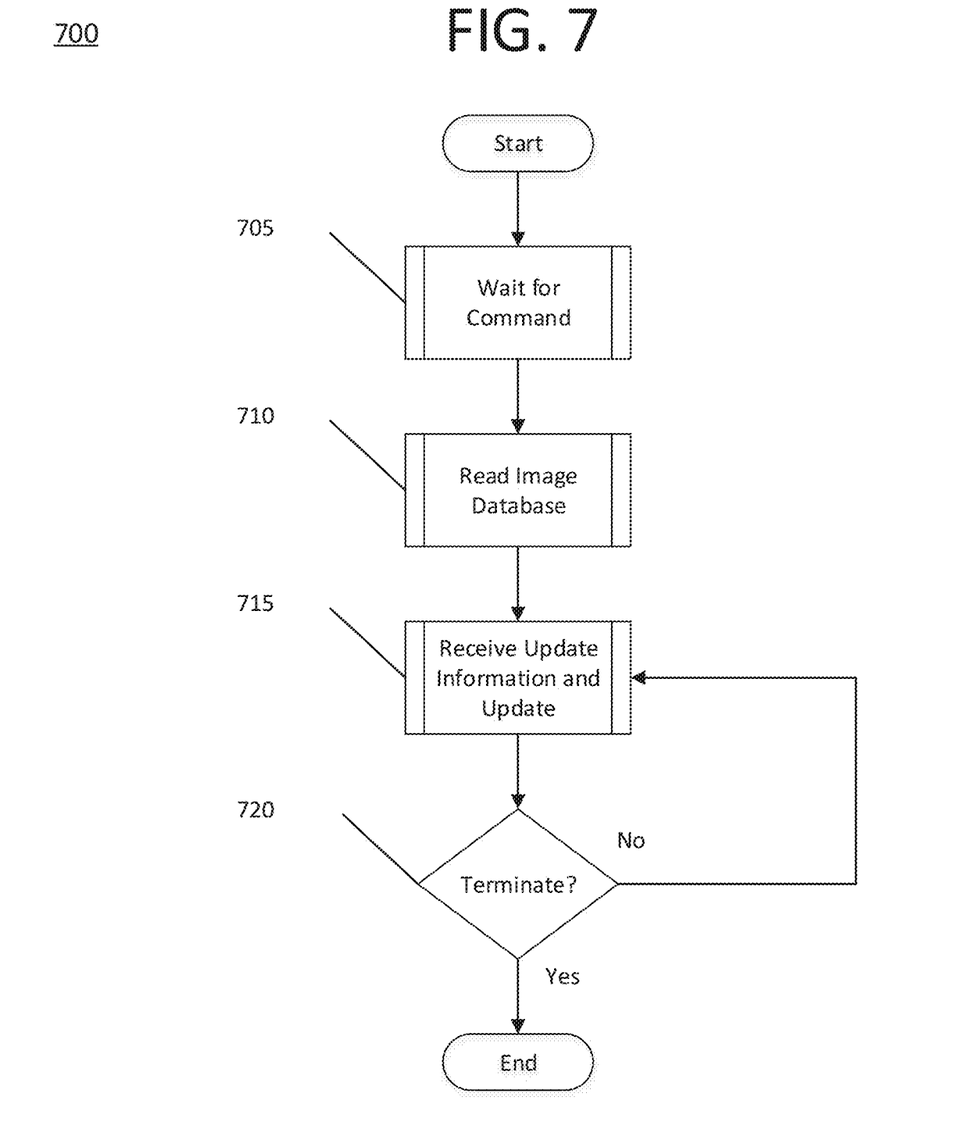
FIG. 7 is a flow diagram illustrating an initialization process executed by the RiG renderer modules, according to an embodiment of the present invention.

FIG. 7 is a flow diagram 700 illustrating an initialization process executed by the RiG renderer modules, according to an embodiment of the present invention. In some embodiments, the process of FIG. 7 may be executed by computing system 200 of FIG. 2, for example. It should be appreciated that the initialization process executed by the RiG renderer modules may be performed after the RiG manager module boots up the RiG renderer modules.

In this embodiment, the runtime process begins at 705 with the RiG renderer modules listening (or waiting) for data packets or commands from host computer or RiG manager module. At 710, the RiG renderer modules read the image and/or spatial database when commanded by the RiG manager module, or in some embodiments, by the host computer. At 715, when the image database is loaded, each RiG renderer module simultaneously receives update information from the host computer, and updates the loaded image database and simulation information accordingly. The update information may include weather and cloud-layer control, time-of-day settings, placement and control of moving objects in the scene, as well as viewpoint update information as defined today in the JIGI Interface Control Document, an Ethernet based data packet protocol.

At 720, determines whether a terminate instruction or shutdown instruction is received from RiG manager module. If an instruction is not received, the RiG renderer modules use the latest data from the RiG manager module and the host computer to update their assigned synthetic environment at 715. Synthetic environment may include outside simulated world, a head-down display, a heads-up display, a moving map display, or other simulation display. If an instruction to terminate is received, process terminates.

Figure 8:
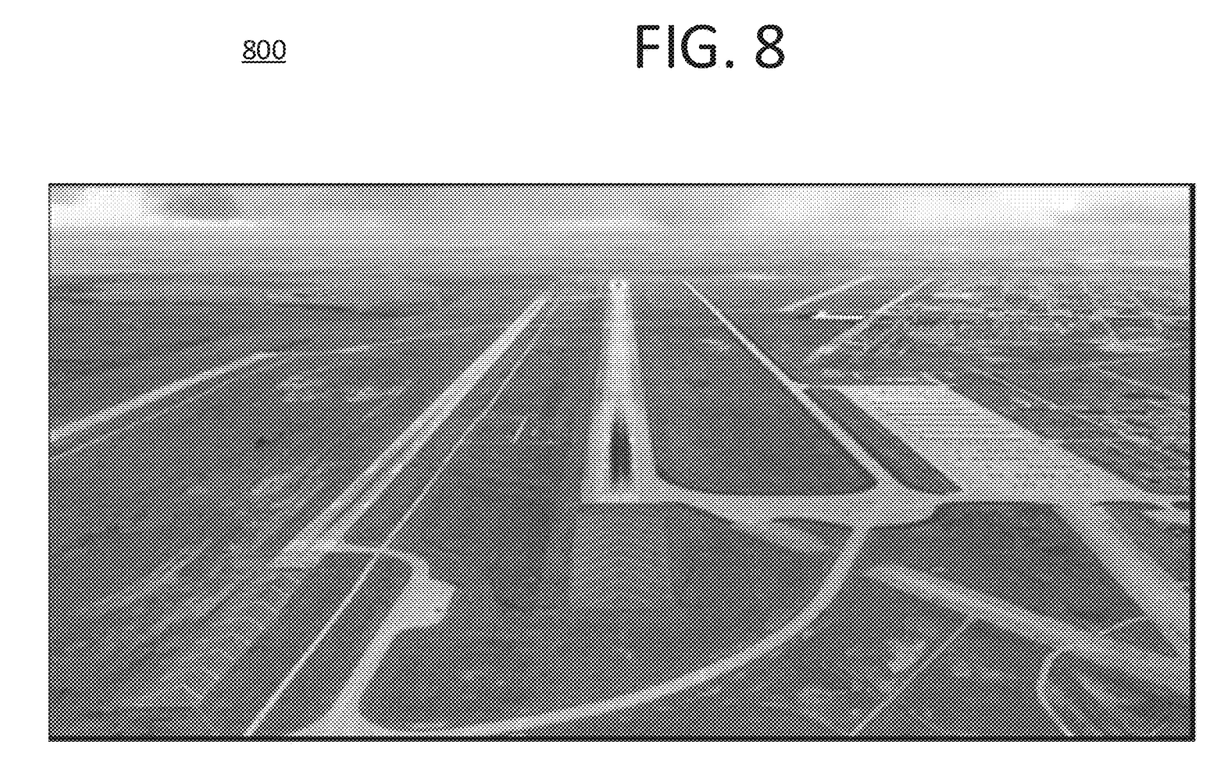
FIGS. 8 and 9 illustrate screen shots of images generated from the OBVA simulator, according to an embodiment of the present invention.
Figure 9:
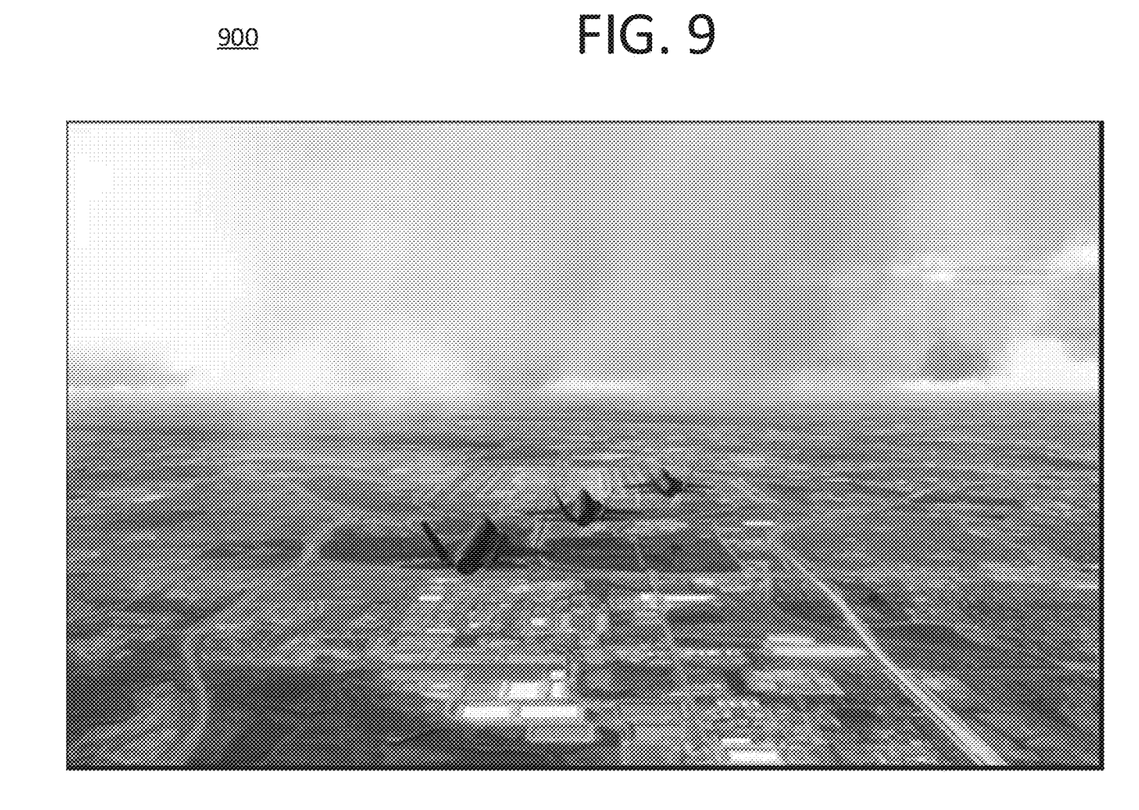

FIGS. 8 and 9 illustrate screenshots of images 800 and 900 generated by the OBVA simulator, according to an embodiment of the present invention. In particular, the screenshots show the visual simulation databases derived using the RiG Terrain Tools combined with legacy databases for cultural and added scene elements. The RiG Terrain Tools semi-automated generation process yields higher fidelity databases than would normally be created using traditional processes. These databases encapsulate a higher fidelity spatial and/or image dataset than could be consumable by existing image generation technology.

Image 800 of FIG. 8 shows a sample synthetic world built by the RiG system. The synthetic environment was derived using the database generation system for the RiG and is based upon Sheppard Air Force Base (AFB) in Texas, one of the primary flight training environments for young United States Air Force (USAF) pilots. Image 900 of FIG. 9 shows a sample synthetic world representing the Dallas-Fort Worth (DFW) airport. This database was built using the RiG system, and the F-35 fighter aircraft were built using the Creator Pro editor (COTS tool) and added to the application (flying in formation with the ownship viewpoint) for demonstration purposes.

The processes shown in FIGS. 3, 4, 6, and 7 may be performed, in part, by a computer program, encoding instructions for a nonlinear adaptive processor to cause at least the processes described in FIGS. 3, 4, 6, and 7 to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the processes described in FIGS. 3, 4, 6, and 7, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

In summary, embodiments of the present invention pertain to a RiG that matches conditions of the real world and produce the necessary amount of pixels at a rate of 120 frames per second. By have an increased rate of 120 frames per second, image brightness is retained and motion-induced blur is reduced. This update rate allows for stereo images from a single image generator and/or display. RiG also achieves low latencies due to synchronization of data across all computing devices.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
   memory comprising a set of instructions; and
   at least one processor, wherein
   the set of instructions, with the at least one processor, are configured to cause the apparatus to
   extract image and/or spatial data from an acquired set of source data, and format the extracted image and/or spatial data into a runtime database,
   optimize the image and/or spatial data by compiling the image and/or spatial data into a runtime database, and
   combine the compiled runtime database with an existing database to produce an integrated database, allowing the integrated database to be read into at least one reconfigurable image generator.

2. The apparatus of claim 1, wherein the integrated database comprises the compiled image and/or spatial data and existing image and/or spatial data.

3. The apparatus of claim 1, wherein the set of instructions, with the at least one processor, are further configured to cause the apparatus to calculate a spatially bound database index.

4. The apparatus of claim 3, wherein the calculated spatially bound database index represents a set of indices used to create the runtime database.

5. The apparatus of claim 3, wherein the set of instructions, with the at least one processor, are further configured to cause the apparatus to acquire the set of source data, and extract the image and/or spatial data as defined by the spatially bound database index.

6. The apparatus of claim 1, wherein the set of instructions, with the at least one processor, are further configured to cause the apparatus to determine whether additional indices require processing to acquire and extract additional image and/or spatial data.

7. The apparatus of claim 6, wherein the set of instructions, with the at least one processor, are further configured to cause the apparatus to compile the extracted image and/or spatial data into an optimized runtime database.

8. The apparatus of claim 7, wherein the set of instructions, with the at least one processor, are further configured to cause the apparatus to combine the compiled and optimized runtime database with existing databases to produce the integrated database to be read into the at least one reconfigurable image generator.

9. A system for rendering reconfigurable image data, comprising:
   a host computer operably connected to a plurality of rendering devices and a managing device; and
   bidirectional communication connections between the host computer, each of the plurality of rendering devices and the managing device,
   wherein the managing device is configured to instruct at least one computer processor to generate an image and/or spatial database, the database having a central spatial index location from which an image building process is initiated.

10. The system of claim 9, wherein the host computer is configured to simultaneously multicast, via an image generator interface, data packets to each of the plurality of rendering devices and the managing device.

11. The system of claim 9, wherein the multicast is at a rate of 120 frames per second.

12. The system of claim 9, wherein the managing device is configured to instruct the plurality of rendering devices to load image and/or spatial data from an integrated database prior to entering runtime.

13. The system of claim 9, wherein the managing device is further configured to listen for updates from a host computer, and instruct the plurality of rendering devices to update a synthetic environment when the updates are received.

14. The system of claim 9, wherein the managing device is further configured to multicast updates to the host computer with information loaded from an integrated database.

15. The system of claim 9, wherein the plurality of rendering devices are configured to load image and/or spatial data from an integrated database when a command is received from the managing device and/or the host computer.

16. The system of claim 15, wherein the plurality of rendering devices are further configured to simultaneously receive an update from the host computer, and update the integrated database with updated simulation information.

17. The system of claim 9, wherein each of the plurality of rendering devices comprises a frame locked or swap locked graphic subsystems.

18. The system of claim 9, wherein the managing device is configured to simultaneously or independently control each of the plurality of rendering device.

19. The system of claim 9, wherein the managing device is further configured to boot the plurality of rendering devices sequentially or simultaneously.

20. The system of claim 9, wherein the managing device is further configured to load image and/or spatial data across each of the plurality of rendering devices sequentially or simultaneously.

* * * * *